July 21, 1953 W. B. CALLAWAY 2,646,464

POLAR RELAY BIASING CIRCUIT

Filed June 23, 1950

INVENTOR
W. B. CALLAWAY
BY John E. Cassidy
ATTORNEY

Patented July 21, 1953

2,646,464

UNITED STATES PATENT OFFICE 2,646,464

POLAR RELAY BIASING CIRCUIT

William B. Callaway, Hackensack, N. J., assignor to Bell Telephone Laboratories, Incorporated, New York, N. Y., a corporation of New York Application June 23, 1950, Serial No. 170,009

5 Claims. (Cl. 178—69)

This invention relates to improvements in electric impulse transmission systems for the conveyance of intelligence, such as a telegraph message, and/or the control of switches, such for instance as those employed in extending or completing connections in telephone, telegraph, teletypewriter data transmission and other systems.

More particularly the invention relates to instrumentalities for compensating in a secondary or biasing circuit for variations in a primary or operating circuit. In the embodiment in which the invention is presently incorporated, variations in a line circuit applied to an operating winding of a polar relay are compensated in a biasing circuit connected to the relay through the connection of a variable impedance control element to the operating circuit and the connection of a responsively controlled variable impedance element to the biasing circuit. Variations in the line conditions effect changes in the control element and responsively in the controlled element to compensate in the secondary or biasing circuit for the changes applied to the operating circuit by the line.

The controlling element and the controlled element may take a number of different forms depending upon the objectives to be attained. In the present embodiment changes in the electrical conditions of a line, connected to the operating winding of a polar relay, effect changes in a heating element arranged in heat exchange relation with a heat responsive variable resistance connected to a biasing winding of the polar relay. Variations in current in the line tending to adversely affect the operation of the polar relay are compensated by means of responsive variations in the heat responsive variable resistance connected to the secondary or biasing winding of the relay.

The invention may be understood from the following description when read with reference to the attached drawing showing a preferred embodiment in which the invention is presently incorporated. It is to be understood, however, that the invention is not limited to the specific arrangement described and shown herein, but will find general application wherever it is desirable to compensate for variations in line conditions.

Refer now to the drawing in which.

First to describe the invention generally, there are many switching circuits, such for instance as telegraph repeater circuits, and dial or interrupter controlled relay circuits, employed in establishing communication connections, in which a line is connected generally in series with an operating winding on a relay which may for instance be a polar relay having, in addition to the operating winding another winding or other windings including a biasing winding. The line may be for instance an open wire line subject to variations in capacitance or resistance to ground due to varying weather conditions. It may be a conductor in a cable subject to variations in resistance due to changes in temperature. The line further may be one of a number of trunks or loops of differing lengths interconnecting different central stations or connecting subscribers' stations to a central station respectively. As the line current increases due to any cause, the current through a relay operating winding which may be connected in series with the line increases, causing the relay to operate faster than normally. In accordance with the present invention these changes in line current affect a control for a variable resistance connected in the biasing circuit.

Figure 1:
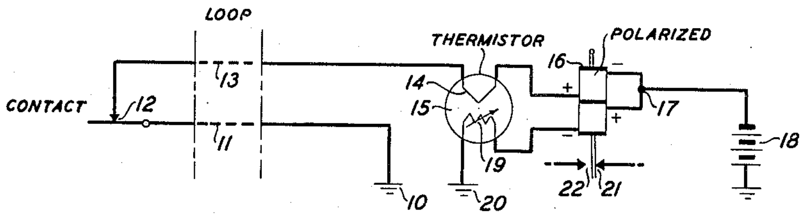
Fig. 1 shows a telegraph communication circuit or relay switching circuit to which the invention has been applied.

In the embodiment shown in Fig. 1 an indirectly heated thermistor is employed. The heating element is connected in series with the line and with the top or operating winding of a polar relay. The heat responsive variable resistance element, in this particular embodiment a resistance the magnitude of which decreases in response to increases in heat, is connected in series with the biasing winding of the relay. As the current in the operating winding increases, the current in the biasing winding is increased to compensate. In another embodiment wherein it may be required to increase the current in a second wind ing in response to decreases in heat in a first winding obviously the heat responsive resistance may have a positive coefficient.

In Fig. 1 a circuit is shown, which may be a telegraph communication circuit or a telephone or telegraph switching circuit for controlling the extension or termination of a communication path, or a circuit which performs both functions. The circuit may be traced from ground 10 at the central office through bottom loop conductor 11, telegraph or teletypewriter transmitting contact, or dial contact 12, at the subscriber's station, top loop conductor 13, heating element 14 of the thermistor 15, top or operating winding of polar relay 16 and apex 17 to battery 18. From apex 17 a biasing circuit may be traced through the bottom winding of relay 16 and heat responsive variable resistance element 19 to ground 20.

The effect of current flowing in the upper winding of polar relay 16 tends to actuate its armature to engage with its right-hand contact 21 as shown and this effect is dominant over the countereffect of current flowing in the bottom or biasing winding tending to actuate the armature to engage contact 22. For the closed condition of contact 12 therefore, the armature is in engagement with its right-hand contact 21 as shown. When contact 12 is opened the armature of relay 16 is actuated to engage contact 22 under the influence of current in its biasing winding.

Ordinarily, in circuits which operate on a current, no-current basis and which do not include the present biasing circuit compensating arrangement, if the magnitude of the current in the biasing winding is established at one-half the magnitude of the normal line current, it causes the armature 16 to operate between its opposed contacts 21 and 22 with equal speed in each direction only when the line current is normal. When the magnitude of the line current varies for any reason, since the magnitude of the biasing current remains fixed, the armature is not operated with equal speed in each direction which causes signal bias which is a variation in duration of signal length.

Signal bias tends to limit the speed of signaling. The shorter the duration of the signal transmitted, the greater the percentage distortion introduced by a given difference in speed of operation of the armature in each direction.

The present invention compensates for variations in the magnitude of the line current by means of thermistor 15. As the line current increases the temperature of the heating element 14 of the thermistor increases. The variable resistance 19 of the thermistor has the characteristic that its magnitude decreases in response to increase in heat of heating element 14. Since variable resistance element 19 is connected in series in the biasing circuit an increased current will flow in the bottom or biasing winding of relay 16 to compensate for the increased line current.

Thermistors are well known in the art being described for instance in Patents 2,184,847, 2,280,257 and 2,276,864 issued to G. L. Pearson, December 26, 1939, April 21, 1942, and March 17, 1942, respectively, 2,253,577 issued to G. L. Pearson et al. August 26, 1941, and 2,407,288 issued to J. J. Kleimack et al. September 10, 1946.

When employed in an open and closed circuit of the embodiment per Fig. 1, the thermistor to be employed should have the characteristic that its temperature rises quickly in response to the flow of current through the heating element and its temperature falls more slowly as the current through the heating element decreases. The lag in the temperature decline as the current falls and the relatively faster increases as the current increases tends to maintain the resistance of variable resistance element 19 at a relatively low level throughout the open interval of contact 12.

Figure 2:
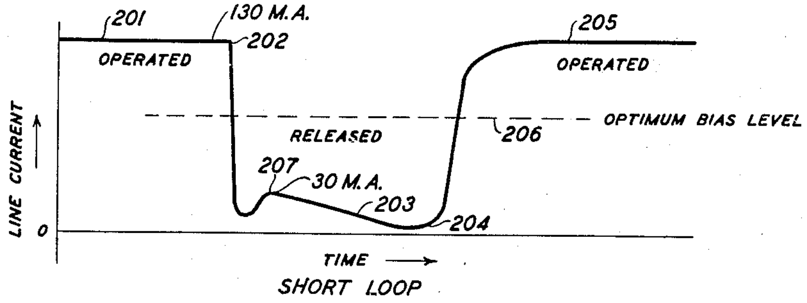
Figs. 2 and 3 show current versus time graphs used in describing the invention.
Figure 3:
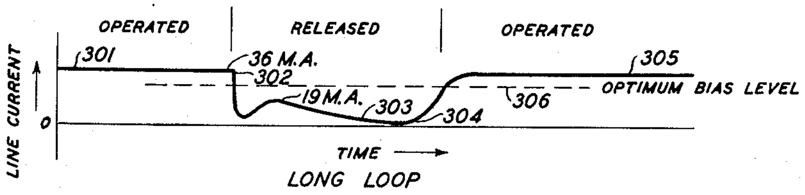

Refer now to Figs. 2 and 3 which disclose diagrammatically the improvement effected by the present invention.

In Figs. 2 and 3 the heavy full line is a plot of line current against time and the dotted line the optimum bias current level when the bias compensating arrangement of the present invention is not employed. Fig. 2 applies for a short loop and Fig. 3 for a long loop. In each figure the horizontal ordinate represents time and the vertical ordinate current.

Referring first to Fig. 2, line 201 represents the current in the loop 11, 13 and in the top or line winding of relay 16 after the contact 12 has been closed and steady state conditions have been established.

When the contact 12 is opened at 202 the current falls very rapidly, then rises slightly and falls more slowly, approaching zero, until the contact is reclosed at 204 when it rises to its original level at 205. The amplitude of the current when the circuit is short is relatively high as indicated at 201 and 205. It may be assumed as 130 milliamperes, a characteristic value. The amplitude of the peak 207 which occurs shortly after contact 12 is opened may be assumed to be 30 milliamperes, a characteristic value for such peaks on short loops.

Fig. 3 shows the conditions for a long loop. The current curve has a pattern generally similar to that of Fig. 2 except that the current amplitude is smaller throughout since the loop is longer. In this figure the steady state current when the loop is closed is assumed to be 36 milliamperes and the peak of the transient, when contact 12 is closed, 19 milliamperes, characteristic values for long loops.

In a typical system which includes both short and long loops therefore and which does not have the benefit of the present invention, it is necessary that the armature of relay 16 operate to engage contact 21 when the loop is long and only 36 milliamperes flow through it, and that, when the contact 12 is opened, the armature be operated to engage contact 22 under the influence of the current in its biasing winding, while, for a short loop, a 30-milliampere transient peak occurs in the line winding acting in an opposing direction. To insure that the armature is not kicked off contact 22 by the transient peak on short loops, it is necessary that the biasing current be greater than 30 milliamperes. Since on long loops the steady state line current is only 36 milliamperes, the biasing current is established at the mid-point between the short loop open contact peak of 30 milliamperes and the long loop closed contact condition of 36 milliamperes or at 33 milliamperes. This affords only a 3-milliampere margin between the short loop open contact peak and the long loop closed contact condition.

Under this condition the duration of the signal intervals generated by relay 16 in response to the opening and closing of contact 12 will differ from the duration of the signals as transmitted since the magnitude of the biasing current is a compromise to insure operation on loops of all lengths.

The optimum bias level for a short loop considered alone under the conditions assumed for Fig. 2 would be mid-way between 30 milliamperes and 130 milliamperes or about 80 milliamperes. The optimum bias level for a long loop considered alone under the conditions assumed for Fig. 3 would be mid-way between 19 milliamperes and 36 milliamperes or about 27½ milliamperes. The compromise biasing current value of 33 milliamperes differs from each of these optimum values so for both short and long loops the signals generated by relay 16 will be biased and they will be unbiased only for loops of an optimum mid-length.

As mentioned in the foregoing, the biasing of the signals limits the speed at which signals may be transmitted. In the interest of reducing the holding time of a sender or other expensive switching equipment, in a mechanical switching communication system, for instance, with contact 12 considered as a dial, it is desirable to be able to transmit the dial pulses rapidly, such as by means of a preset dial. Assuming a constant bias, the shorter the duration of the signal interval the greater the percentage of distortion and a signal duration is reached beyond which it is impossible to further shorten the signals because of the bias. Bias is a limiting factor also in the speed with which telegraph signals may be transmitted.

When a thermistor is introduced as in Fig. 1 it is possible to consider each loop separately. The thermistor characteristics may be chosen to establish the biasing current at the mid-level between the closed and open circuit signal levels for a wide range of loop lengths individually, thus substantially eliminating bias on loops of differing lengths. For instance on a long loop, which requires the closest tolerances, the bias current may be established at 27.5 milliamperes which is 8.5 milliamperes greater than the 19-milliampere peak and 8.5 milliamperes less than the 36-milliampere full line current. This contrasts with a difference of but 3 miliamperes between the biasing current and the short-loop full line current when the biasing current is established at the compromise value of 33 milliamperes.

What is claimed is:

1. A polar relay having a line winding and a biasing winding, a thermistor having a heating eelement and a heat responsive variable resistance in said thermistor responsive to said heating element, said heater being connected in circuit with said line winding and said variable resistance being connected in circuit with said biasing winding.

2. An indirectly heated thermistor having a heating element and a heat responsive variable resistance, a polar relay having a line winding and a biasing winding thereon, said line winding connected to said heating element and said biasing winding connected to said variable resistance.

3. In an impulse circuit a polar relay having a line winding and a biasing winding, a thermistor having a heating element and a variable resistance element responsive to said heating element, said line winding connected to said heating element and said biasing winding connected to said variable resistance.

4. A central station and an outlying station, a polar relay at said central station, an operating winding and a biasing winding on said relay, an impulse transmitter at said outlying station, a circuit path connecting said transmitter and said operating winding, a thermistor having a heating element connected to said operating winding and a heat responsive variable resistance connected to said biasing winding, the magnitude of said variable resistance decreasing in response to an increase in heat.

5. In an impulse transmitting system, an impulse transmitter at a transmitting station connected by means of a circuit path to an impulse receiver at a receiving station, said receiver having a biasing means, said path subject to variations in impedance due to changes in length or to changes in weather conditions effecting bias in said receiver, and a compensator for said variations comprising a controlling element in said path responsive to variations in said path connected to said receiver and a controlled element responsive to said controlling element connected to said biasing means in said receiver, said controlling element, a heater developing heat in proportion to the current in said circuit path, said controlled element, a heat responsive variable resistance, the magnitude of said resistance decreasing in response to an increase in heat.

WILLIAM B. CALLAWAY.

References Cited in the file of this patent

UNITED STATES PATENTS

| Number | Name | Date |
| --- | --- | --- |
| 2,034,881 | Scheer | Mar. 24, 1936 |
| 2,138,963 | Gannett | Dec. 6, 1938 |
| 2,337,929 | Richards | Dec. 28, 1943 |
| 2,401,343 | Erickson | June 4, 1946 |